Aug. 23, 1938.   T. E. PIAZZE   2,127,960
METHOD OF AND APPARATUS FOR PERFORATING
Filed Dec. 7, 1936
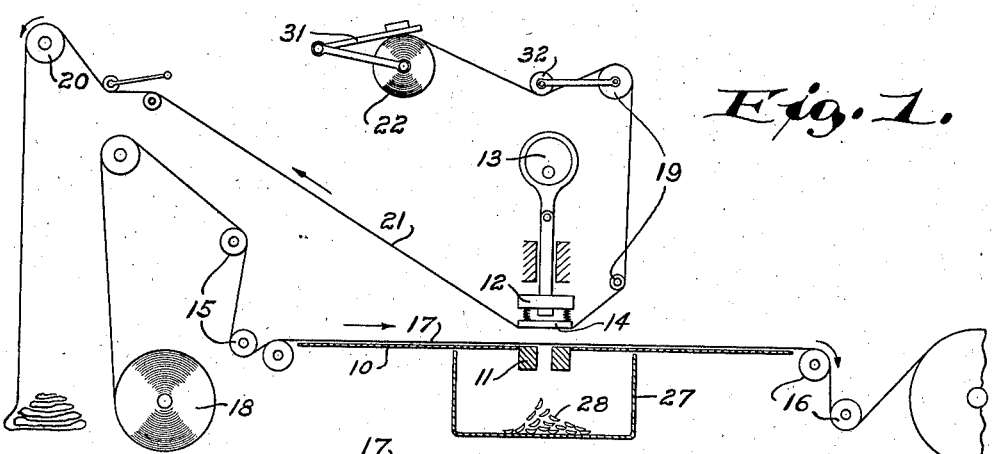
Fig. 1.
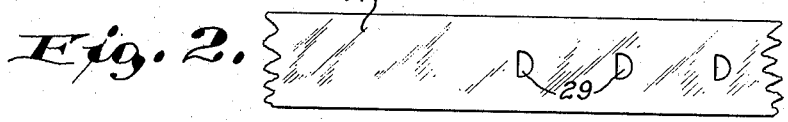
Fig. 2.
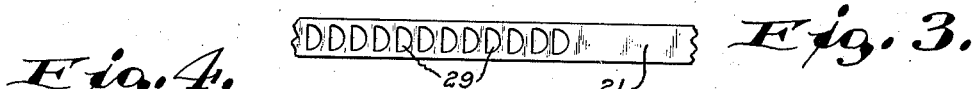
Fig. 3.
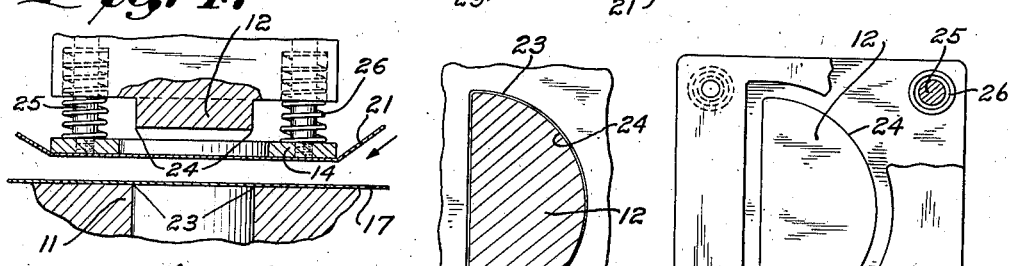
Fig. 4.
Fig. 7.   Fig. 8.
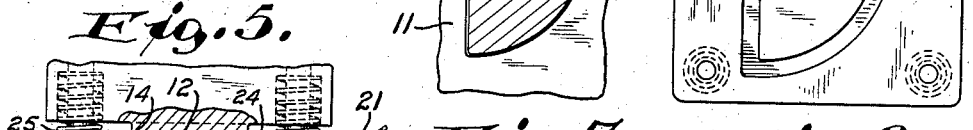
Fig. 5.
Fig. 9.
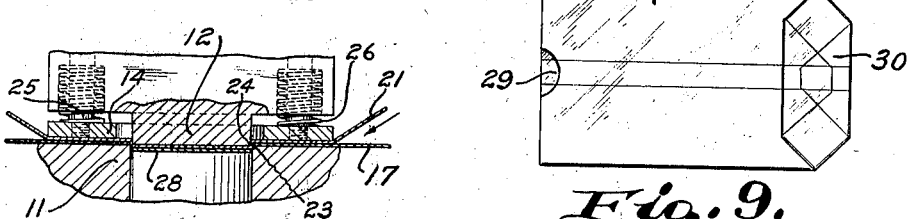
Fig. 6.
INVENTOR.
Thomas E. Piazze
BY Morsell, Lieber & Morsell
ATTORNEYS.

Patented Aug. 23, 1938

2,127,960

UNITED STATES PATENT OFFICE 2,127,960

METHOD OF AND APPARATUS FOR PERFORATING

Thomas E. Piazze, Milwaukee, Wis., assignor to Milprint Products Corporation, Milwaukee, Wis., a corporation of Delaware Application December 7, 1936, Serial No. 114,659

28 Claims. (Cl. 164—18)

The present invention relates generally to improvements in the art of cutting sheet material with the aid of relatively movable cutters, and relates more specifically to an improved method of and apparatus for shearing or perforating materials such as cellulose film with cooperating dies.

In general, an object of my present invention is to provide an improved process of producing smooth cut edges during the cutting or perforation of relatively flexible and thin sheet materials, and of preserving the cutting edges of the dies or other shearing elements.

Considerable difficulty has heretofore been encountered in the manufacture of articles from sheet material such as cellulose film, and especially in the production of smooth edges where the material is cut or perforated. It is present universal practice to perforate such sheet materials with the aid of snugly interfitting relatively movable dies, by either intermittently or continuously advancing single ply ribbons of the stock between the cooperating male and female die members and by causing these cooperating elements to produce successive perforations in the stock. Unless the dies are very sharp and accurately constructed with minimum clearance between the cooperating cutting edges, it is impossible to avoid the formation of jagged cut edges; and even if the dies are accurately and properly interfitted, the jarring and vibration of the machinery frequently causes the opposed cutting edges to contact each other and to chip or wear, thereby necessitating frequent repairs and consequent loss of production. The usual clearance between opposed cutting edges of ordinary dies is about one-half to one thousandths of an inch, and if this clearance is materially increased with the prior methods, it is impossible to make clean perforations in relatively hard but thin and highly flexible sheets such as regenerated cellulosic material. The prior method therefore not only causes undesirable interruption in production resulting from the frequent renewal of dies, but also involves excessive die work in order to provide for the necessary accurate cooperation with minimum clearances between the opposed cutting edges.

It is therefore an object of my present invention to provide an improved method of perforating such sheet material as cellulose film or sheeting, whereby relatively loosely interfitting dies may be utilized to insure sharp and clean perforation of the film for an extended period of time and at minimum cost of production.

A more specific object of the present invention is the provision of an improved process of and apparatus for punching a succession of perforations in a continuous ribbon of cellulose sheeting, in a most effective manner and at a high rate of speed.

Another specific object of the invention is to provide an improved die assemblage especially adapted for the perforation of relatively thin and flexible sheet material, which will function effectively regardless of jarring or vibration to which the die assemblage may be subjected during normal operation.

A further specific object of this invention is to provide a new and useful punch structure comprising relatively movable dies, wherein the material to be perforated is intermittently advanced between the dies and is clamped in position while at rest and during the perforating operation by the initial relative movement of the dies and in which the dies are thoroughly protected.

Still another specific object of my invention is to provide a new mode of perforating superimposed sheets of thin stock, and of releasing the individual sheets after the cutting operations have been completed.

These and other specific objects and advantages will be apparent from the following detailed description.

A clear conception of the several steps involved in my present improved method, and of the general construction and operation of one type of apparatus for effecting commercial exploitation thereof, may be had by referring to the drawing accompanying and forming a part of this specification wherein like reference characters designate the same or similar parts in the various views.

Fig. 1 is a diagram of a machine or system especially adapted to produce a succession of perforations in an elongated ribbon of thin sheet material;

Fig. 2 is a fragment of the ribbon of primary material showing the approximate location of several of the perforations;

Fig. 3 is a similar fragment of a ribbon of secondary or other material used in conjunction with my improved process;

Fig. 4 is a somewhat enlarged and distorted diagrammatic central vertical section through my improved die assemblage, showing the dies in inactive or fully separated condition;

Fig. 5 is a similar section of the die assembly, showing the movable die initially advanced toward the fixed die so as to clamp the intervening ribbons against the latter;

Fig. 6 is another similar section through the dies, showing the action which takes place during the perforating operation;

Fig. 7 is a fragmentary somewhat distorted top view of the cutting edge of the fixed die and a section through the lower portion of the movable die;

Fig. 8 is a bottom view of the movable die showing the clamping plate partly broken away; and Fig. 9 is a view of one of the completed bags which may be produced with the aid of this invention.

Although my invention has been shown and described herein by way of illustration, as being applied in a method of and a machine for perforating a ribbon of cellulose film in order to form thumb notches in successive bags produced from the ribbon, it is not the intent to thereby unnecessarily restrict the scope, since the improved cutting or perforating method may be susceptible of more general application to cellulose and other flexible sheet materials.

Referring to the drawing, and especially to Fig. 1 which discloses diagrammatically one system for carrying on my improved method, the assemblage comprises in general an elongated stationary support or table 10 having a female or fixed die 11 associated therewith; a male or movable die 12 movable toward and away from the fixed die 11 by means of an eccentric 13 and having a resiliently retractable clamping plate 14 associated therewith; a series of rollers 15, 16 for intermittently advancing a relatively wide ribbon 17 of primary material such as cellulose film along the table 10 between the dies 11, 12 from a supply roll 18; and a series of rollers 19, 20 for likewise intermittently advancing a somewhat narrower ribbon 21 of secondary material such as waste paper between the dies 11, 12 from a supply roll 22 but in the opposite direction and at a different speed from that of the ribbon 17.

The lower fixed die 11 has a substantially semi-circular opening which is surrounded by a cutting edge 23, and the upper movable die 12 has substantially semi-circular cross-section and is provided with a cutting edge 24 cooperable with that of the fixed die 11. While the cross-sections of the fixed die opening and of the punch portion of the movable die are similar in shape, these dies 11, 12 interfit with considerable clearance between the cutting edges 23, 24 thereof, as substantially indicated in Fig. 7, and this clearance should be sufficient to prevent direct contact between these cutting edges due to vibration, and to permit the secondary sheet 21 to substantially envelope the cutting edge 24 of the movable die 12 during each final perforating operation. The clamping plate 14 has a considerably enlarged central semi-circular opening therein and is suspended from the movable die 12 with the aid of parallel guide pins 25, each of which is embraced by a spring 26, and these springs permit the plate 14 to clamp the intervening superimposed ribbons 17, 21 against the top of the fixed die 11 during downward initial movement of the die 12 and prior to each perforating operation, see Figs. 4, 5, 6 and 8. The punch die 12 may also have its lower face angled slightly out of the horizontal so as to provide a shearing effect by causing successive adjoining portions of the cutting edge 24 to become effective as the die 12 is lowered.

The table 10 which supports the fixed die 11 and over which the ribbon 17 is transported in the direction indicated by the arrows in Fig. 1, may have a receptacle 27 disposed beneath the opening of the lower die for the purpose of catching the cuttings 28; and one or more of the conveying rollers 15, 16 may be driven so as to intermittently advance the continuous ribbon 17 from the supply roll 18 and between the dies 11, 12 by steps of such length that this ribbon may subsequently be severed into successive sections at the straight end of each perforation 29, and each section may thereafter be converted into a finished article such as a bag 30, see Figs. 1, 2 and 9. As previously indicated, the primary ribbon 17 may be composed of relatively hard, thin and flexible material such as cellulose film, of any suitable width, and the perforations 29 need not necessarily be semi-circular but may be of any desired shape. The secondary or waste material of the ribbon 21 may be ordinary paper of the same or slightly greater thickness than that of the ribbon 17, and this ribbon 21 is preferably intermittently advanced between the dies 11, 12 in contact with the clamping plate 14 by considerably shorter steps and in the opposite direction from the primary ribbon 17 as indicated by the arrows in Fig. 1 and by the perforations 29 in Fig. 3. Since the ribbon 21 ultimately becomes waste stock, the perforations 29 therein may be formed closely adjacent to each other, and the driving roller 20 is adapted to maintain the ribbon 21 taut and to deliver the perforated portion thereof over the end of the machine. In order to prevent undesirable slack in the advancing ribbon 21 during rotation of the eccentric 13, the supply roll 22 may be provided with a friction plate 31 and the portion of this ribbon just beyond the roll 22 may be engaged by a weighted roller 32 as illustrated diagrammatically in Fig. 1, and the machine should be otherwise equipped with accessories so as to insure proper normal operation thereof.

During normal operation of the improved apparatus or system the successive steps of my improved process are carried on in substantially the following order. The upper or movable die 12 is being continuously reciprocated in substantially vertical alinement with the lower or fixed die 11, and the ribbons 17, 21 are being intermittently advanced in opposite directions and by successive steps as hereinabove indicated, so as to cause dwells in the advancement of both ribbons when the clamping plate 14 is effective and perforation is taking place. When the male die 12 advances the clamping plate 14 downwardly from the position shown in Fig. 4 to that of Fig. 5, so as to cause the latter to clamp the adjacent portions of the ribbons 17, 21 in superimposed position against the top of the female die 11, the ribbons are stationary, and the punch portion of the male die is subsequently brought into contact with the secondary ribbon 21. As the male die 12 proceeds, the ribbon 21 envelopes the cutting edge 24 of this die and coacts with the cutting edge 23 of the female die 11, as shown in Fig. 6, to shear a cutting 28 from the lower ribbon 17. Further advancement of the punch die 12 ultimately also shears a cutting 28 out of the upper ribbon 21 and the two adjoining cuttings 28 thereafter drop into the receptacle 27. Each of these perforating operations is followed by an upward withdrawal of the movable die 12, and as soon as the clamping plate 14 is withdrawn sufficiently to break the contact between the ribbons 17, 21, the ribbon supporting rollers again become quickly effective to advance the ribbons preparatory to subsequent perforation. The advancement of the ribbons 17, 21 in opposite directions, or at differential speeds in the same direction, and the advancement of the ribbons away from each other as soon as they leave the zone of cutting, are steps of importance since this differential motion and separation of the ribbons quickly releases them from each other in case they tend to adhere along the cut edges.

From the foregoing description it will be apparent that the present improved method for cutting materials such as cellulose film, is extremely simple and automatic, and this method has been found in actual practice to produce cut edges which are far superior to those produced by any prior known methods. The enveloping of the cutting edge of one of the dies with relatively inexpensive waste material, tends to materially prolong the life of the cutting edges of both dies, and eliminate necessity of interfitting the dies with the same care that was required with the prior method where close clearances were necessary. The enlargement of the clearances between the dies also assists in preserving the cutting edges and in prolonging the life thereof, by eliminating possibility of direct engagement of the cutting edges due to vibration, and the cost of the waste material used in the ribbon 21 is insignificant compared to the cost of constructing and repairing dies under the old methods. The ribbon 21 may obviously be formed of any suitable material such as paper, or it may even be formed of cellulose film similar to that of the ribbon 17. While I have shown my process as being carried out by apparatus wherein the ribbons 17, 21 are held fixed during the perforating operation, the same principle of perforating may be applied to other types of die assemblages such as rotary die units wherein the dies are constantly revolving about different axes, and obviously the same advantages may be obtained during the perforation of other kinds of sheet material. The improved method has proven highly practical and successful in actual commercial operation in the manufacture of bags from cellulosic film, but this particular application of my invention should not be considered a necessary limitation as to the applicability thereof.

It should be understood that it is not desired to limit this invention to the exact steps of the process and to the precise use thereof, herein shown and described, for various modifications within the scope of the claims may occur to persons skilled in the art.

I claim:

1. The method of shearing sheet material with the aid of cooperating dies, which comprises, positioning primary and secondary sheets of material between the dies, and causing said secondary sheet to fold over the cutting edge of one of the dies and to cooperate in folded condition with the cutting edge of the other die during subsequent shearing of said primary sheet.

2. The method of shearing sheet material with the aid of cooperating dies, which comprises, positioning a sheet of primary material and a sheet of other material between the dies, clamping said sheets to one of the dies, and causing said other material to fold over the cutting edge of the other die and to cooperate in folded condition with the other die to effect subsequent shearing of said primary material.

3. The method of perforating sheet material with the aid of fixed and movable cooperating dies, which comprises, positioning sheets of primary and other material between the dies, clamping said sheets to the fixed die, and causing said other material to fold over the cutting edge of the movable die and to advance in folded condition toward the fixed die during subsequent perforation of said primary material.

4. The method of perforating sheet material with the aid of cooperating dies, which comprises, intermittently advancing sheets of primary and other material between the dies, clamping the sheets while at rest to one of the dies, and causing said other material to fold over the cutting edge of the other die and to cooperate in folded condition with the cutting edge of the other die to effect subsequent perforation of said primary sheet.

5. The method of perforating sheet material with the aid of loosely interfitting cooperating dies, which comprises, positioning superimposed sheets of primary and other material between the dies with the primary material adjacent the female die, clamping said sheets to the female die, and causing said other material to fold over the cutting edge of the male die and to advance in folded condition toward the female die during subsequent perforation of said primary material.

6. The method of perforating sheet material with the aid of fixed and movable cooperating dies, which comprises, positioning superimposed sheets of primary and other material between the dies with the primary material adjacent the fixed die, utilizing the initial movement of the movable die to clamp said sheets against the fixed die, and causing said other material to fold over the cutting edge of the movable die and to cooperate in folded condition with said fixed die to effect subsequent perforation of said primary material.

7. The method of perforating sheet material with the aid of cooperating dies, which comprises, progressively advancing independent ribbons of primary and other material between the dies, clamping the ribbons while at rest to one of the dies, causing said other material to envelope the cutting edge of the other die during subsequent perforation of said primary ribbon, and finally withdrawing said ribbons from between the dies at differential speeds.

8. The method of perforating sheet material with the aid of cooperating dies, which comprises, progressively advancing independent ribbons of primary and other material between the dies, clamping the ribbons while at rest to one of the dies, causing said other material to envelope the cutting edge of the other die during subsequent perforation of said primary ribbon, and finally withdrawing said ribbons from between the dies in opposite directions.

9. The method of perforating sheet material with the aid of cooperating dies, which comprises, progressively advancing independent ribbons of primary and other material between the dies, clamping the ribbons while at rest to one of the dies, causing said other material to envelope the cutting edge of the other die during subsequent perforation of said primary ribbon, and finally withdrawing said ribbons from between the dies and thereafter advancing the same away from each other to separate the ribbons at the perforations therein.

10. The method of shearing cellulose film with the aid of cooperating dies, which comprises, positioning a cellulose film and a sheet of paper between the dies, and causing said paper to envelope the cutting edge of one of the dies during subsequent shearing of said cellulose film.

11. The method of perforating cellulose film with the aid of fixed and movable cooperating dies, which comprises, positioning cellulose film and a sheet of paper between the dies, clamping said film and paper to the fixed die, and causing said paper to envelope the cutting edge of the movable die during subsequent perforation of said cellulose film.

12. The method of perforating cellulose film with the aid of fixed and movable cooperating dies, which comprises, positioning ribbons of cellulose film and of paper between the dies with said film directly adjacent to the fixed die, and subsequently bringing the movable die in contact with said paper to perforate said film while such contact is maintained.

13. The method of perforating cellulose film with the aid of loosely interfitting cooperating dies, which comprises, positioning cellulose film and a sheet of paper between the dies with the cellulose film adjacent the female die, clamping said film and sheet to the female die, and subsequently advancing the male die through said cellulose film while in contact with said paper to perforate said film.

14. The method of perforating cellulose film with the aid of cooperating dies, which comprises, progressively advancing ribbons of cellulose film and paper between the dies, clamping the ribbons while at rest to one of the dies, causing said paper to envelope the cutting edge of the other die during subsequent perforation of said cellulose film, and finally withdrawing said ribbons from between the dies at differential speeds.

15. The method of perforating cellulose film with the aid of cooperating dies, which comprises, progressively advancing ribbons of cellulose film and paper between the dies, clamping the ribbons while at rest to one of the dies, causing said paper to envelope the cutting edge of the other die during subsequent perforation of said cellulose film, and finally withdrawing said ribbons from between the dies in opposite directions and at differential speeds.

16. The method of perforating cellulose film with the aid of fixed and movable cooperating dies, which comprises, intermittently advancing ribbons of cellulose film and paper between the dies in opposite directions, utilizing the initial movement of the movable die to clamp said ribbons against the fixed die, subsequently causing the movable die to engage the paper and to drive the same through said cellulose film to perforate the latter, and finally advancing said ribbons from between the dies at differential speeds.

17. In combination, a pair of cooperating loosely interfitting dies, means for positioning superimposed sheets of material between said dies, and means for moving one of said dies to drive the material of one of said sheets through another and into the other die.

18. In combination, cooperating fixed and movable dies, means for positioning superimposed sheets of cellulose film and paper between said dies with said cellulose film adjacent to the fixed die, and means for advancing said movable die to drive a portion of said paper through said film and past the cutting edge of the fixed die.

19. In combination, a pair of cooperating loosely interfitting dies, means for positioning superimposed sheets of material between said dies, means for moving one of said dies to drive the material of one of said sheets through another and into the other die, and means for subsequently withdrawing said sheets from between said dies at different speeds.

20. In combination, cooperating fixed and movable dies, means for positioning superimposed sheets of cellulose film and paper between said dies with said cellulose film adjacent to the fixed die, means for advancing said movable die to drive a portion of said paper through said film and past the cutting edge of the fixed die, and means for subsequently withdrawing said sheets from between said dies in different directions.

21. In combination, cooperating loosely interfitting dies, means for positioning superimposed sheets of material between said dies, and means for relatively moving said dies to initially cause one sheet to fold over the edge of one die and to thereafter cooperate with the cutting edge of the other to shear the other sheet.

22. In combination, cooperating loosely interfitting dies, and means for relatively moving said dies to cause one of two superimposed sheets of material located between the dies to initially fold over the edge of one die and to thereafter cooperate with the cutting edge of the other to shear the other sheet.

23. In combination, cooperating loosely interfitting male and female dies, means for positioning superimposed sheets of material between said dies, and means for relatively moving said dies to initially cause one sheet to fold over the edge of the male die and to thereafter cooperate with the cutting edge of the other to shear the other sheet.

24. In combination, cooperating loosely interfitting male and female dies, and means for relatively moving said dies to cause one of two superimposed sheets of material located between the dies to intially fold over the edge of the male die and to thereafter cooperate with the cutting edge of the female die to perforate the other sheet.

25. The method of shearing sheet material with the aid of cooperating dies, which comprises, causing one of two superimposed sheets located between the dies to fold over the edge of one die and to thereafter cooperate in folded condition with the cutting edge of the other die to effect shearing of the other sheet.

26. The method of perforating sheet material with the aid of cooperating relatively movable dies, which comprises, causing one of two superimposed sheets located between the dies to fold over one die an to thereafter cooperate in folded imperforate condition with the cutting edge of the other die to effect perforation of the other sheet.

27. The method of shearing cellulose film with the aid of cooperating dies, which comprises, causing a sheet of paper positioned between the film and one die to fold over said die and to subsequently cooperate in folded condition with the other die to effect shearing of the film.

28. The method of perforating cellulose film, which comprises, causing a sheet of paper to envelope one die and to thereafter cooperate with the other die to perforate the film.

THOMAS E. PIAZZE.